Jan. 27, 1959  T. HOTCHKISS, SR  2,871,026
TRAILER HITCH
Filed May 8, 1957  3 Sheets-Sheet 1
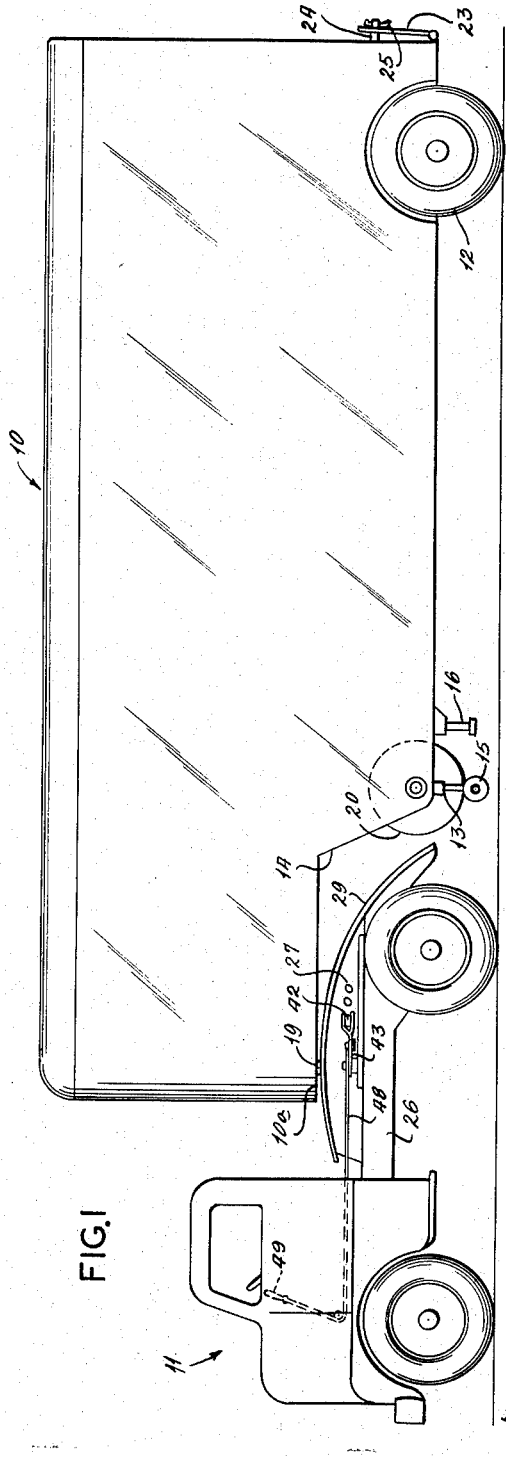
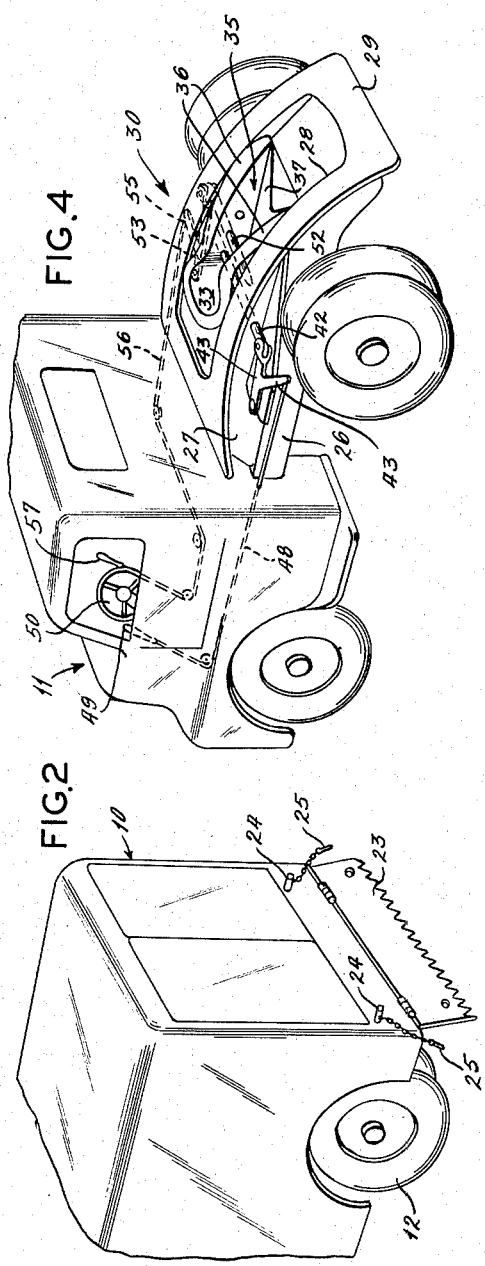
INVENTOR
THOMAS HOTCHKISS SR.
ATTORNEYS.

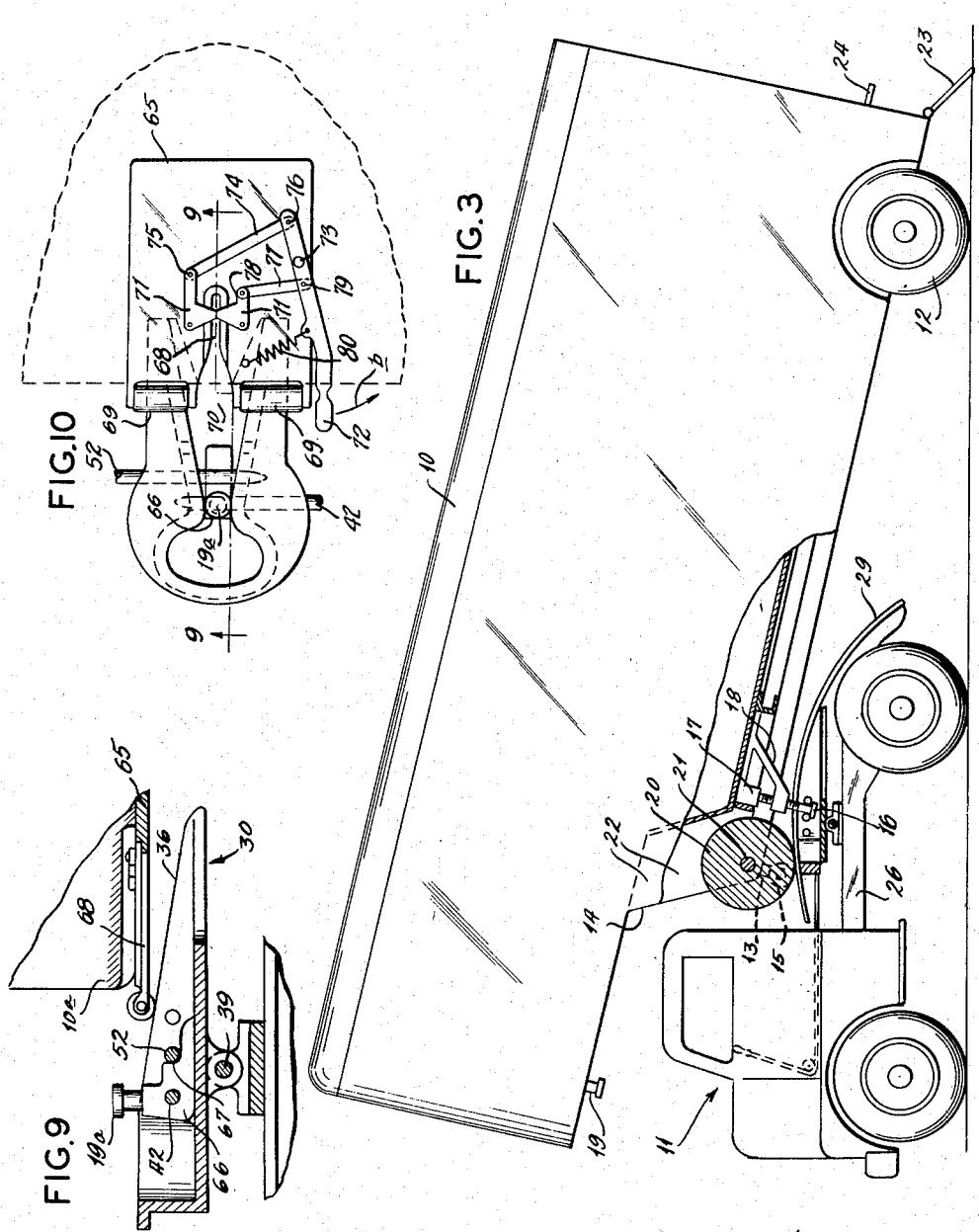

Jan. 27, 1959 T. HOTCHKISS, SR 2,871,026
TRAILER HITCH
Filed May 8, 1957 3 Sheets-Sheet 3
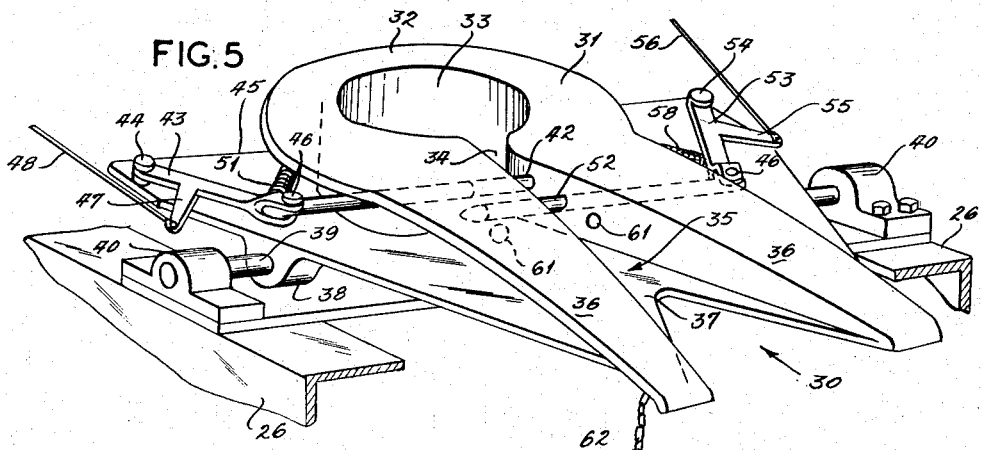
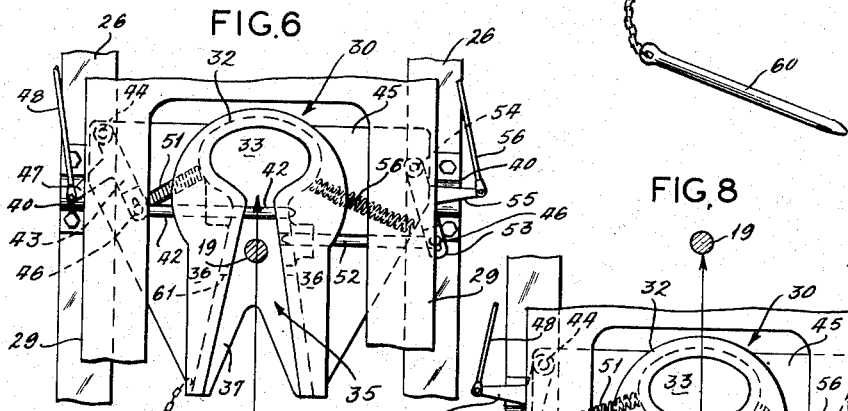
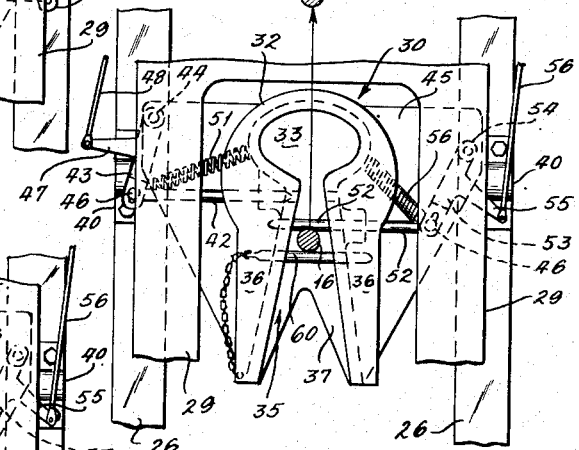
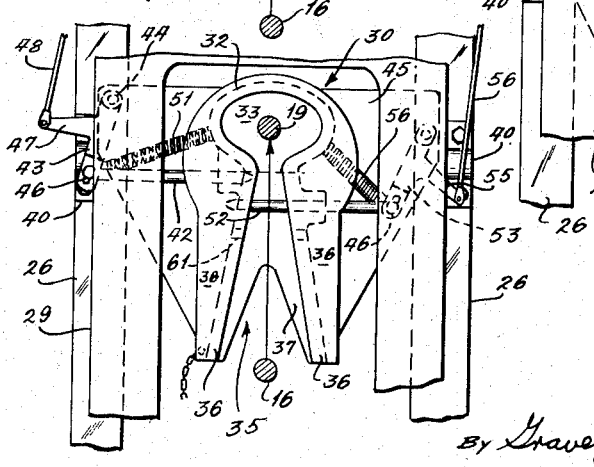
INVENTOR
THOMAS HOTCHKISS SR.
By Gravely, Lieder, Woodruff & Wills
ATTORNEYS

United States Patent Office 2,871,026
Patented Jan. 27, 1959

2,871,026

TRAILER HITCH

Thomas Hotchkiss, Sr., St. Louis, Mo.

Application May 8, 1957, Serial No. 657,859

11 Claims. (Cl. 280—423)

This invention relates to improvements in hitch devices for connecting trailers to tractors in different positions for obtaining specific benefits in versatility, maneuverability, and convenience of operation.

An important object hereof is to provide a hitch device which, due to its construction and arrangement, will permit a trailer to be connected to a tractor in different positions without interfering with the usual maneuverability of the tractor.

An object also is to provide an improved hitch device which can be applied to existing commercial equipment to render it capable of making use of the improvements and benefiting by the advantages usually reserved to original constructions.

Another object is to provide driver operated means for retaining the trailer connected to the tractor in several desired positions, and to arrange this means so that the connections desired are obtained at the driver's station and by relative movement between the trailer and its tractor, thereby avoiding difficulties or hazards.

A further object is to provide a structure which will be simple, relatively inexpensive to produce and install, and will be efficient, durable and produce a great improvement in this art.

The invention consists in a tractor mounted hitch device having a novel construction adapted to receive a king pin of the trailer in several positions, and means to hold the king pin as desired or to release it. The invention is also embodied in cooperating means on the tractor and trailer to obtain the different positions of the trailer by manuevering the tractor relative to the trailer. The invention further consists in the combination of an improved hitch device on the tractor formed with a king pin receiver terminating in a recess, king pins on the trailer carried in different elevated positions, apron and roller means to change the trailer inclination as desired, and bar means for the hitch device to selectively engage the higher king pin for level trailer positions and engage the lower king pin for inclined trailer positions. The invention preferably consists in the arrangement and combination of parts to be hereinafter more fully described and claimed, and which, in the best form known to me at the present time, is illustrated in the drawings, wherein:

Fig. 1 is a side elevational view of a typical tractor-trailer combination in which the present improvements are embodied;

Fig. 2 is a fragmentary perspective view of the rear end of the trailer showing a drop gate;

Fig. 3 is a longitudinal elevational view, with portions shown in broken section, illustrating a position of the tractor and trailer differing from that shown in Fig. 1;

Fig. 4 is a perspective view of the tractor assembly illustrating the improved hitch device;

Fig. 5 is an enlarged and fragmentary perspective view of Fig. 4 showing the hitch device;

Fig. 6 is a fragmentary plan view of the hitch device of Fig. 5, wherein the king pins affixed to the trailer are illustrated in one position of operation;

Fig. 7 is a view similar to Fig. 6, but showing a different position for the king pins;

Fig. 8 is a view similar to Fig. 6, but illustrating a still further position of the king pins; and, Figs. 9 and 10 are respectively fragmentary elevational and plan views of a modified trailer hitch device in which the principles of the present invention are embodied.

Referring particularly to Figs. 1 and 3, the embodiment of the present invention is disclosed in connection with a van type trailer 10 and any usual automotive tractor unit 11, both trailer and tractor being constructed in known manner insofar as the components thereof are concerned which do not affect the character, arrangement or construction of the present improvements. It will be unnecessary to give any description with respect to the trailer or the tractor, except as it will be necessary to explain this invention.

In Fig. 1, the trailer 10 has the usual rear wheels 12 and adjustable landing gear 13 disposed forwardly of the wheels 12, and preferably at the position on the trailer where the usual step 14 is provided, the step 14 being arranged to receive the rearmost portions of the tractor 11 when making the customary towing connection. The landing gear 13 consists in supporting structure for carrying the ground engaging rollers 15, and such means (not shown) as is necessary to extend and retract the landing gear rollers 15. In the area adjacent the landing gear 13 the trailer 10 is provided with an auxiliary king pin 16 attached to the underside of the trailer by a suitable structure. This structure includes a base 17 and a bracket 18 for adjustably retaining the pin 16 in position to cooperate with the hitch device. The trailer is also provided with the usual king pin 19 which is suitably attached to the trailer within the zone of the step 14.

A trailer lifting roller 20 (Figs. 1 and 3) is suitably supported adjacent the step 14, and is positioned transversely of the trailer body upon a suitable axle 21 supported by both legs of the landing gear in front of the supporting structure 17 for the auxiliary king pin 16. In addition, the trailer 10 is provided with a drop gate 23 (Fig. 2) having serrations which are adapted to dig into the road surface when the gate is dropped to the position shown in Fig. 2, and the trailer 10 is moved in a rearward direction. The gate 23 is intended to support the weight of the trailer and to lift the trailer wheels 12 so there will be great resistance imparted to rearward motion of the trailer when the tractor 11 is being moved from the position of Fig. 1 into the position of Fig. 3. The drop gate 23 may be held in an inoperative position by being swung upwardly to the vertical position and held on posts 24 by means of the key pins 25.

A preferred form of the present invention is shown in Figs. 4 to 8, inclusive, and reference will be made to these views for the details of the improved hitch device 30. The tractor 11 is suitably provided with a curved apron platform 29 having the central cutout 28 adapted to expose the hitch device 30 and permit either of the king pins 19 or 16 to pass into the device 30. The apron 29 is carried on the chassis 26 of the tractor 11 by suitable supports 27. The apron 29 is curved to function properly when the tractor 11 backs under the trailer 10 to lift the forward end of the trailer 10 into an inclined position. This function is attained when the king pin 19 is permitted to disengage from the hitch device 30. The inclined position for the trailer is illustrated in Fig. 3, and at such times the auxiliary king pin 16 is engaged in the hitch device 30.

Referring to Figs. 4 and 5 in particular, the hitch device 30 consists of a suitably formed body 31 which is commonly referred to in this art as a "fifth wheel." The body 31 differs from fifth wheel constructions heretofore known in that it is provided with an enlarged end 32 having a large central recess or opening 33 therein, such recess being open at a channel 34 to communicate with an inlet or receiver 35 formed between jaw elements 36 of the fifth wheel body 31. The receiver 35 is provided with a web 37, or other similar means, for the purpose of structurally connecting the jaws 36. The body 31 of the hitch device 30 is provided with bearings 38 (one being shown in Fig. 5) which are supported on a suitable rocker shaft 39 carried on the chassis 26 of the tractor 11 in bearing blocks 40. The hitch device 30 is free to pivot about shaft 39 and it may be resiliently supported on the tractor 11 in any known or usual manner. It is believed unnecessary to illustrate any particular resilient support.

The hitch device 30 is provided with three bars which are selectively usable for obtaining the benefits and advantages of the present improvement. As shown in Figs. 4 and 5, the channel 34 of the receiver 35 has its sidewalls suitably apertured to receive a bar 42 which is slidable transversely of the channel, and may be withdrawn when desired. Withdrawal of bar 42 is accomplished by the lever 43 pivotally mounted at 44 on the base structure 45 of the body 31. The lever 43 is also pivotally connected at 46 to the outer end of bar 42, and at a suitable place between the ends of lever 43 there is provided an operating arm 47 to which is suitably connected an operating cable 48. The cable 48 is conveniently extended through the cab structure (Fig. 4) of the tractor 11 to a control handle 49 located adjacent the steering wheel 50 at the driver's station within the cab. A spring 51 is connected between the lever 43 and a stationary part of the adjacent structure so as to continuously urge the bar 42 to its innermost position which is shown in Fig. 5.

Similarly, a bar 52 is suitably mounted in apertures in the side walls of the receiver channel 34 so as to extend transversely thereof. Bar 52 is likewise retractable by means of a lever 53 pivotally mounted at 54 on the base 45, and pivotally connected at 46 to the outermost end of the bar 52. Lever 53 is provided with an arm 55 to which is suitably connected a cable 56, and this cable 56 extends through the cab structure of the tractor 11 to a control lever 57 adjacent the driver's station. The third one of the three bars previously mentioned is shown at 60, and this bar is manually manipulated and may be inserted or withdrawn from apertures 61 in the sidewalls of channel 34 of the receiver 35. Bar 60 is suitably tethered to the hitch device 30 by a chain 62 so that it will not become misplaced when not in use.

In order to illustrate, in a simple manner, the selective positions between the tractor 11 and trailer 10 which is determined by the improved hitch device 30, reference will now be made to the fragmentary plan views of Figs. 6, 7 and 8 where the bars 42, 52, and 60 have been illustrated in their different operative positions. In Fig. 6, the improved hitch device 30 is illustrated with bar 42 in its normal position extending transversely of the channel 34 so that the receiver 35 is closed to the recess 33 and the jaws 36 will cooperate to guide the king pin 19 into the channel 34 where abutment is obtained at bar 42. During the foregoing operation, bar 52 is fully retracted so it will not interfere with reception of king pin 19, and this is accomplished by operating lever 57 to actuate cable 56. After the king pin 19 has reached a position of abutment with bar 42, the bar 52 may be released to retain king pin 19 between bars 42 and 52, and this position corresponds with the normal connection between the tractor 11 and trailer 10 which is shown in Fig. 1. It should be understood by those skilled in the art that the trailer 10 is prevented by the known types of fifth wheel hitch devices from advancing any farther onto the tractor 11, since the usual trailer hitch devices do not have any space or recess for permitting the king pin 19 to advance beyond the bar 42 where the normal towing position is obtained.

Turning now to Figs. 3 and 7, it will be seen that the trailer 10 can be relatively short coupled to the tractor 11, and this is accomplished in the following manner. When short coupling is desired, the driver does not move bar 52 out of its normal position extending transversely of the receiver 35, but he retracts bar 42 by operating lever 49 and cable 48. This operation removes further obstruction to king pin 19 advancing into the recess 33 in the head portion 32 of the hitch device 30. To accomplish the sequence of operations illustrated in Figs. 1, 3, 7 and 8, the trailer 10 is suitably prevented from moving backwardly by the drop gate 23 so that the tractor 11 can back up into the step 14 where the trailing edge of the apron 29 will engage roller 20. Contact between apron 29 and roller 20 is obtained within a very short distance of travel of the tractor 11 after king pin 19 has been released by bar 42. This is necessary so that the elevation of the trailer 10 can be obtained very rapidly to prevent the corner 10a of the trailer striking the adjacent portions of the tractor cab. Fig. 7 illustrates the condition of operation when the king pin 19 has reached the recess 33 and auxiliary king pin 16 is approaching the receiver 35 between jaws 36. Fig. 8 illustrates the condition shown in Fig. 3, where the trailer 10 is in its fully elevated position with king pin 19 completely free of the hitch device 30, but auxiliary king pin 16 in abutment with the bar 52. In this latter condition, the king pin 16 can be retained by manually inserting bar 60 in its apertures 61 (Fig. 5) so that the tractor can be operated and maneuvered as desired with the trailer 10 securely hitched thereto.

Normal maneuvering of the tractor 11 when hitched to the trailer 10 shown in Fig. 1 includes the ability to turn the tractor 11 broadside relative to the trailer 10. This operation is permitted by reason of the step 14 and the swivelling action permitted by king pin 19 within the fifth wheel hitch device 30. One of the advantages and features of the present invention is illustrated in Fig. 3, where the auxiliary king pin 16 is permitted similar swivelling movement so that the tractor 11 may be maneuvered to a broadside position with respect to the trailer 10. Furthermore, the auxiliary king pin 16 is not called upon to bear the weight of the adjacent end portion of the trailer 10, since the elevating roller 20 is adapted to roll upon apron 29. Also, when rollers 15 are fully retracted (dotted position) they will also roll on apron 29.

In Figs. 9 and 10, a modification is illustrated where the forward portion of the trailer step, adjacent corner 10a is provided with a slotted receiver 65, and the hitch device 30 is provided with a removable type king pin 19a. The king pin 19a is formed with a suitable base 66 which is engaged by bar 42 and bar 52. The bar 42 passes through the base 66 and bar 52 is seated in a recess 67 of the king pin body 66 so as to securely hold the king pin 19a in the position shown in Fig. 9. The receiver 65, having the king pin slot 68 is provided with leading edge rollers 69 which engage on the upper flat inclined faces of jaws 36 and guide the mouth 70 of the receiver 65 into the king pin 19a. A suitable pair of latch detents 71 are operatively mounted on the receiver 65 adjacent the closed end of the slot 68 in order to hold king pin 19a in position. The king pin 19a is primarily arranged to act as an adapter to extend the usefulness of the fifth wheel for operation with automatic type trailer hitches, such as the one shown at 65 in Fig. 10. The king pin 19a, therefore, is removably secured in the fifth wheel by means of the respective bars 42 and 52, and the king pin may be released by retracting these bars through operation of the controls 49 and 57. With the king pin 19a in use, the detents 71 automatically hold the king pin in hitched position, and manual means is provided to release the same. A single manually operated lever 72 is pivoted on the device 65 at 73 and links 74 and 75 connect one of the jaws with the rearward end 76 of the lever, while links 77 and 78 connect the other jaw 71 with a point 79 on the lever 72 at the opposite side of the pivot 73. Accordingly, actuation of lever 72 in the direction of the arrow b will simultaneously open the jaws 71 so that king pin 19a may be retracted from the slot 68, and spring 80 automatically returns the jaws to closed position.

The present invention has advantages not present in previous tractor-trailer combinations and in fifth wheel devices. The roller 20 and apron 29 cooperate to lift the trailer into an inclined position, and the hitch device 30 couples the trailer while in the inclined position so it can be towed and the tractor maneuvered in the usual manner as if the trailer were in the position of Fig. 1. Also, with the trailer in the inclined position of Fig. 3, it is apparent that heavy objects can be drawn into or slid from the trailer with great ease, that the length needed for maneuvering and parking is greatly reduced, and that these and other advantages are provided herein. The features of the device 30 are broadly new in this art, and include trailer towing connections in both the normal and inclined positions (Figs. 1 and 3 respectively), tractor swivel connections for these positions, and safety in situations when the tractor must be stopped quickly, as the king pins 19 or 19a and 16 can be released by retracting bars 42 and 52 to permit the trailer 10 to move up and over the tractor cab, thereby avoiding the hazard of the trailer crashing into the cab while its inertia is being absorbed in the stopping operation. Also, the tractor can be detached if needed while in motion.

It will be observed by those skilled in the art that various changes in the details and arrangement of parts, which have been herein described and illustrated in order to explain the nature of the invention, may be made within the principles and scope of the invention as the same may be defined in the annexed claims.

What is claimed is:

1. In a tractor-trailer combination having level and inclined trailer positions relative to the tractor, a hitch device on the tractor to connect the trailer to the tractor in each of its positions, cooperating means on the tractor and on the trailer adapted to elevate the trailer into its inclined position, and king pin means on the trailer in spaced relation, a different one of said king pin means engaging said hitch device in each of said trailer positions.

2. The combination set forth in claim 1, wherein said king pin means on the trailer are disposed at different elevations.

3. The combination set forth in claim 1, wherein said cooperating means includes a device to engage the ground and hold said trailer during relative movement between the tractor and trailer.

4. The combination set forth in claim 1, wherein said trailer is provided with means adapted to engage the ground to hold the trailer substantially immovable to backing up so that relative movement is obtained by rearwardly moving the tractor.

5. In a tractor-trailer combination having a normal trailer position and a trailer inclined position, a hitch device on the tractor, spaced means on the trailer each adapted to cooperate with said hitch device, and trailer elevating means disposed on said tractor and trailer comprising an apron and a roller adapted to engage each other and elevate the trailer relative to the tractor, said hitch device being adapted to retain one of said spaced means to determine the normal trailer position and to retain another of said spaced means to determine the trailer inclined position.

6. In a tractor-trailer combination having a normal trailer position and a trailer inclined position, trailer elevating means disposed on said tractor and trailer including an inclined apron and cooperating roller adapted to engage, said apron supporting said roller along its inclination upon relative movement between said tractor and trailer, a trailer towing hitch device mounted on said tractor, retainer means in said hitch device selectively positionable to determine the trailer positions, and spaced means on said trailer adapted to engage said hitch device selectively and be retained by said retainer means.

7. In a tractor-trailer combination adapted to have the trailer in horizontal or inclined towing relation, a trailer hitch device carried by the tractor, first means on the trailer engaging said device with the trailer horizontal, an inclined surface on the tractor, roller means on the trailer adapted to engage said inclined surface and elevate the adjacent end of the trailer relative to the tractor to place the trailer in an inclined position with the trailer end elevated above the tractor, second means on the trailer spaced from said first means and also adapted to cooperate with said hitch device for inclined trailer towing, and operable means on said hitch device to connect said first and second means to said hitch device selectively.

8. In a tractor-trailer combination, a trailer hitch device on the tractor, a king pin receiver in said device including a recess, spaced king pins carried by the trailer in position to be received in said king pin receiver selectively, selectively positionable means carried by said device and adapted to engage and retain said king pins one at a time in said receiver, one of said king pins moving into said receiver recess and out of said receiver with entrance of another king pin into said receiver.

9. In a tractor-trailer combination, a trailer hitch device on the tractor, a king pin receiver in said device including a recess, king pins spaced apart on the trailer and carried thereon at different elevations, the higher elevated king pin engaging in said receiver first, selectively operable bar means carried by said hitch device to traverse said receiver annd engage or disengage said higher king pin, one of said selectively operable bar means disengaging said higher king pin to release it for movement into and through said recess, and another of said selectively operable bar means engaging a relatively lower elevated king pin to hitch the trailer in an inclined position relative to the tractor, and a further bar means engaging said lower elevated king pin to retain it in said hitch device for trailer towing.

10. A tractor-trailer king pin hitch device comprising a body formed with a king pin exit recess, a king pin receiver on said body communicating with said exit recess, and king pin engaging bar means movably mounted in said body in advance of said exit recess to engage king pins received by said receiver, selective removal of said bar means releasing a king pin for movement into said exit recess and engagement of another king pin received by said receiver.

11. A tractor-trailer king pin hitch device comprising a body having a king pin recess to receive a king pin released by the hitch, a king pin receiver on said body communicating with said recess, a pair of bar means carried by said body in position to selectively engage a king pin in said receiver and release it for movement to said recess, and a third bar means adapted to cooperate with one of said pair of bar means to engage a king pin therebetween.

References Cited in the file of this patent

UNITED STATES PATENTS

| | | |
|---|---|---|
| 2,142,748 | Fontaine | Jan. 3, 1939 |
| 2,144,243 | Fraser et al. | Jan. 17, 1939 |
| 2,613,945 | Talbert | Oct. 14, 1952 |
| 2,755,104 | Braunberger | July 17, 1956 |
| 2,807,477 | Tuso | Sept. 24, 1957 |

FOREIGN PATENTS

| | | |
|---|---|---|
| 515,191 | France | Nov. 22, 1920 |
| 168,659 | Germany | Mar. 15, 1906 |